United States Patent [19]

Oshnock et al.

[11] Patent Number: 4,575,287
[45] Date of Patent: Mar. 11, 1986

[54] MILLING CUTTER AND METHOD OF ASSEMBLING THEREFOR

[75] Inventors: James A. Oshnock; Robert A. Erickson, both of Latrobe, Pa.

[73] Assignee: Kennametal Inc., Latrobe, Pa.

[21] Appl. No.: 457,865

[22] Filed: Jan. 13, 1983

Related U.S. Application Data

[63] Continuation-in-part of Ser. No. 387,344, Jun. 11, 1982, abandoned.

[51] Int. Cl.[4] .............................................. B23C 5/22
[52] U.S. Cl. ........................................ 407/41; 407/49; 407/94; 407/108
[58] Field of Search ................... 407/41, 49, 94, 108

[56] References Cited

U.S. PATENT DOCUMENTS

| 1,549,634 | 8/1925 | Vokal et al. | 407/49 |
| 1,951,101 | 3/1934 | Miller | 407/49 |
| 2,150,561 | 3/1939 | Reaney | 407/94 |
| 2,229,112 | 1/1941 | Miller et al. | 407/41 |
| 2,751,006 | 6/1956 | Lane | 407/49 |
| 2,785,456 | 3/1957 | Gairing | 407/49 |
| 2,808,638 | 10/1957 | Filippi | 407/94 |
| 2,863,210 | 12/1958 | Tucker | 407/49 |
| 3,027,624 | 4/1962 | Payne | 407/41 |
| 3,056,186 | 10/1962 | Greenleaf | 407/41 |
| 3,091,474 | 5/1963 | Boutros et al. | 407/49 |
| 3,354,527 | 11/1967 | Carlstedt et al. | 407/108 |
| 3,634,918 | 1/1972 | Waisanen | 407/41 |
| 3,739,442 | 6/1973 | Lovendahl | 407/49 |
| 3,776,289 | 12/1973 | Boboltz et al. | 407/49 |
| 3,946,473 | 3/1976 | Petersen | 407/105 |
| 3,965,553 | 6/1976 | Faber | 407/104 |
| 4,044,440 | 8/1977 | Stier | 407/105 |
| 4,227,842 | 10/1980 | Samanta et al. | 407/119 |
| 4,244,666 | 1/1981 | Erkkson et al. | 407/105 |

FOREIGN PATENT DOCUMENTS 903457  6/1972  Canada .................. 407/41

Primary Examiner—Leonidas Vlachos
Assistant Examiner—Jerry Kearns
Attorney, Agent, or Firm—Lawrence R. Burns

[57] ABSTRACT

A milling cutter having a cutter body rotatable about its central axis with a peripheral wall on the cutter body and insert pockets and clamp recesses located in the peripheral wall. The insert pockets have locating surfaces for positioning an insert when placed in the pocket. There is also a clamp for releasably clamping an insert when the insert is placed in position in the pocket. The clamp freely assumes an orientation identical to that of the insert so that planar contact is made with the insert.

1 Claim, 15 Drawing Figures

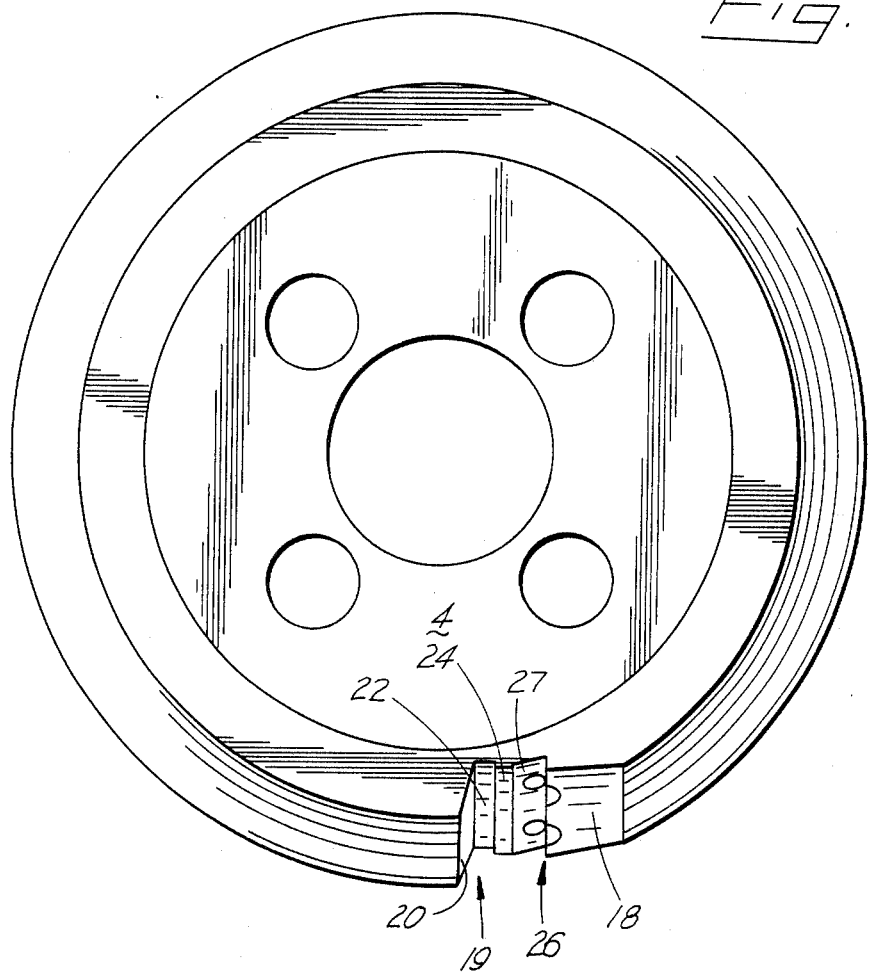
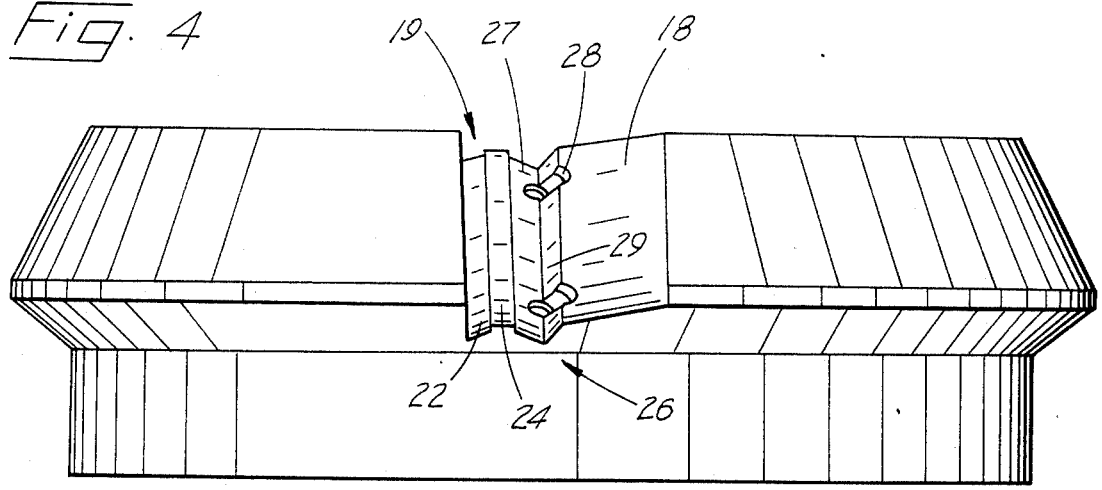

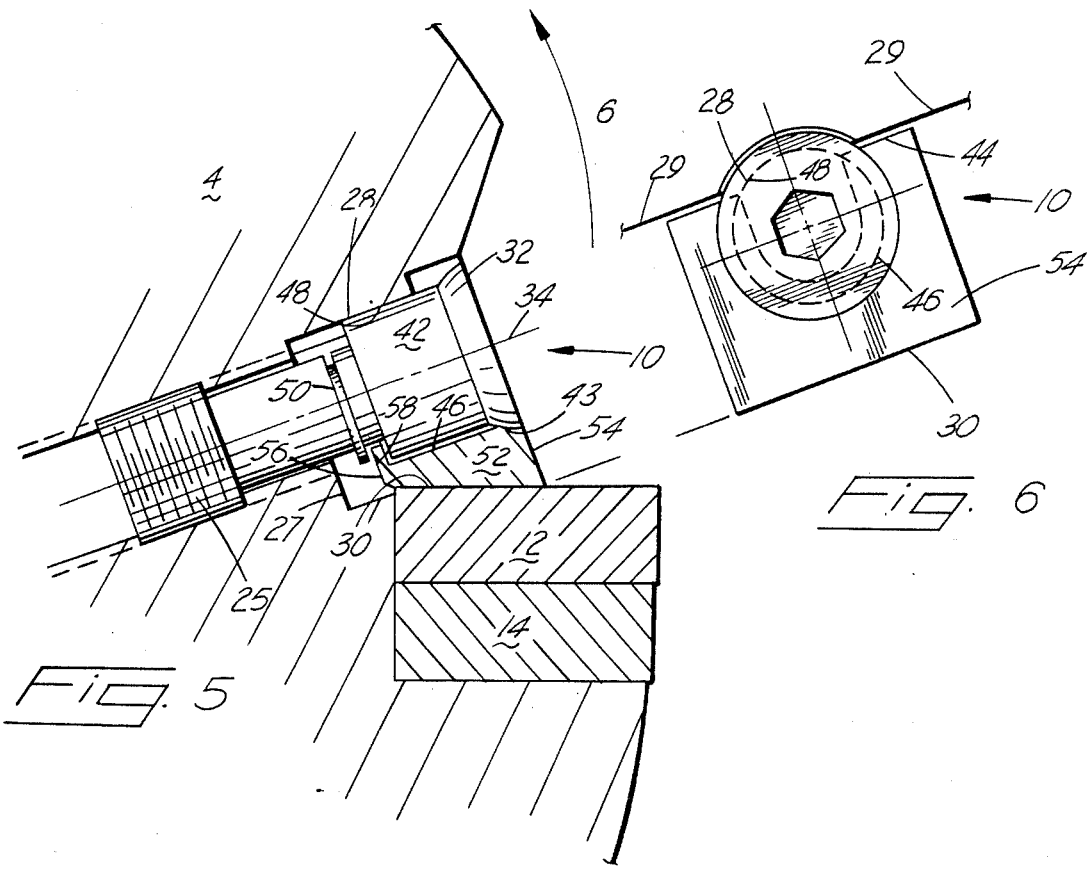
Fig. 5
Fig. 6
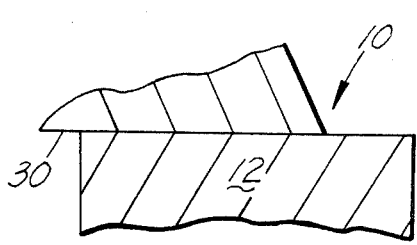
Fig. 7
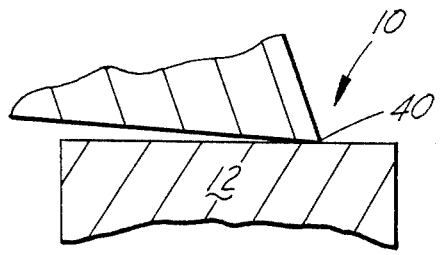
Fig. 8

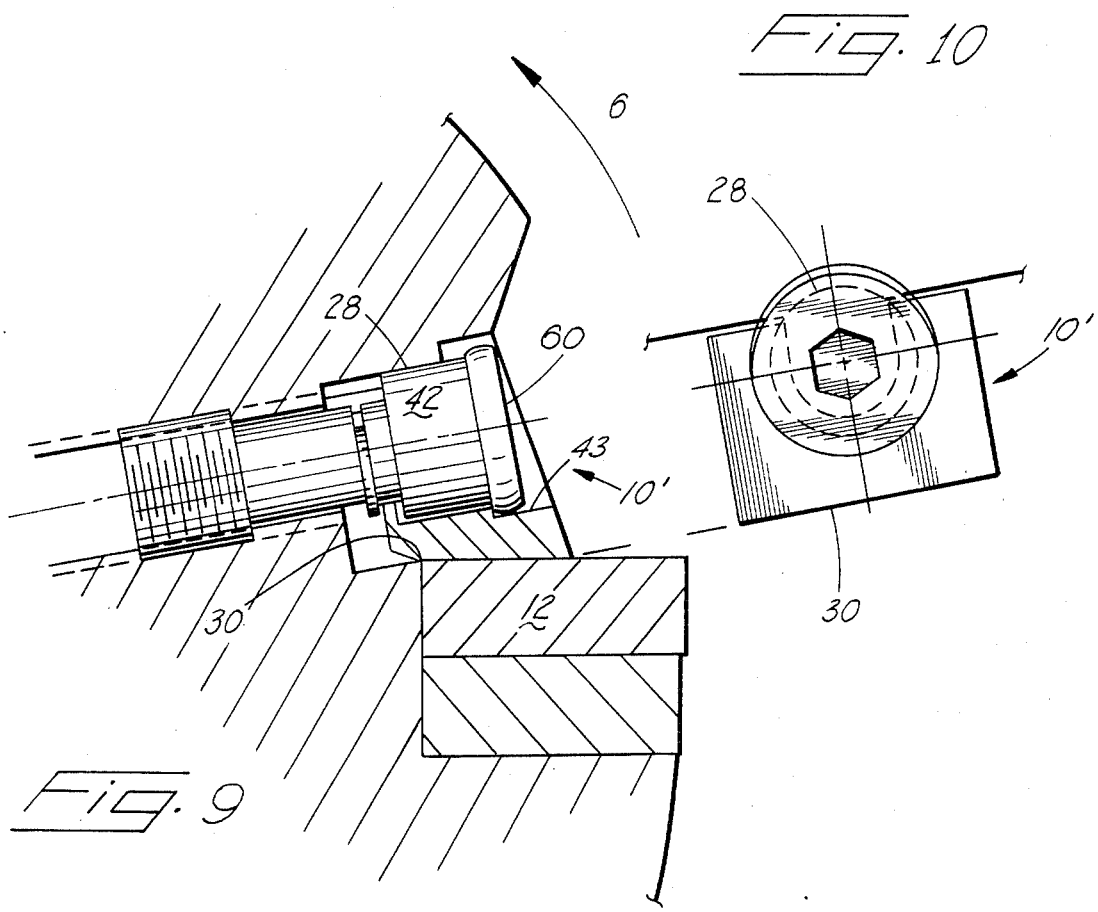

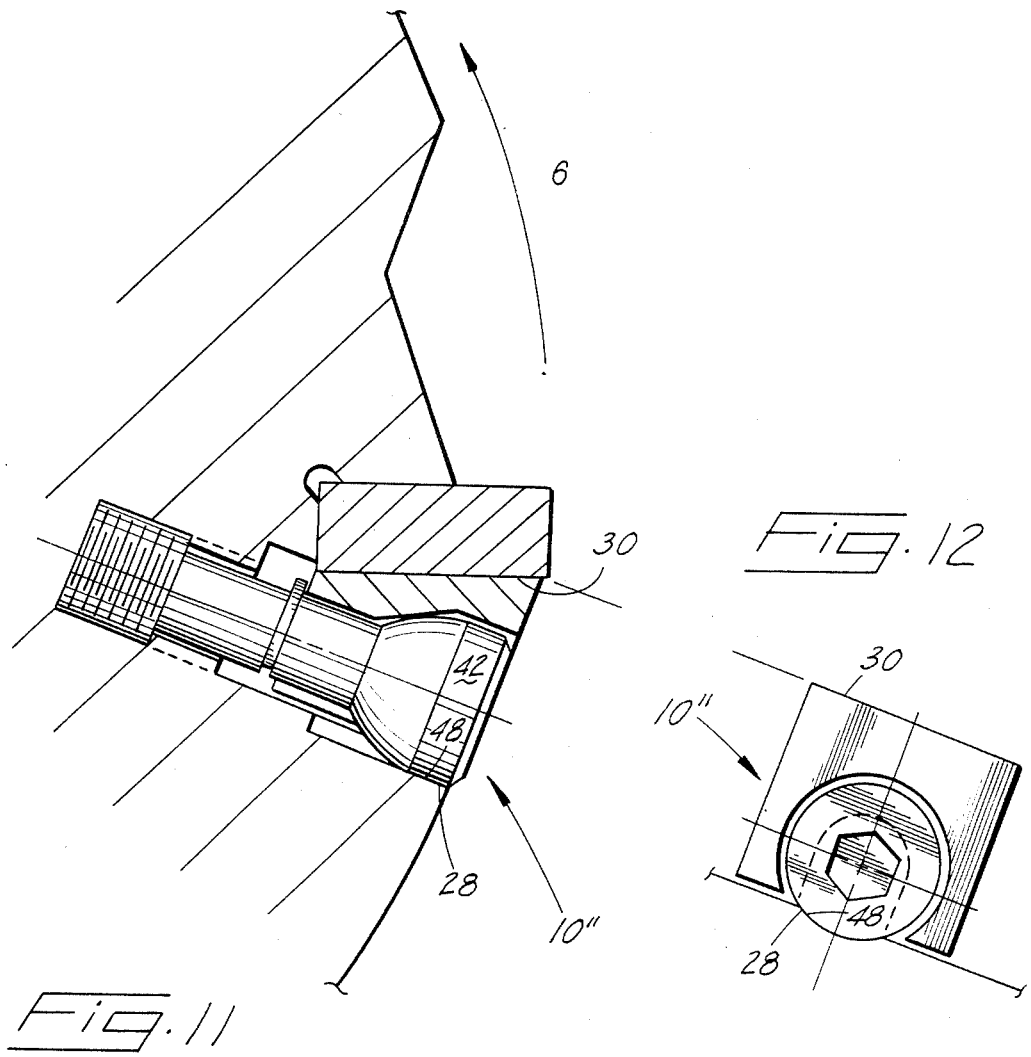

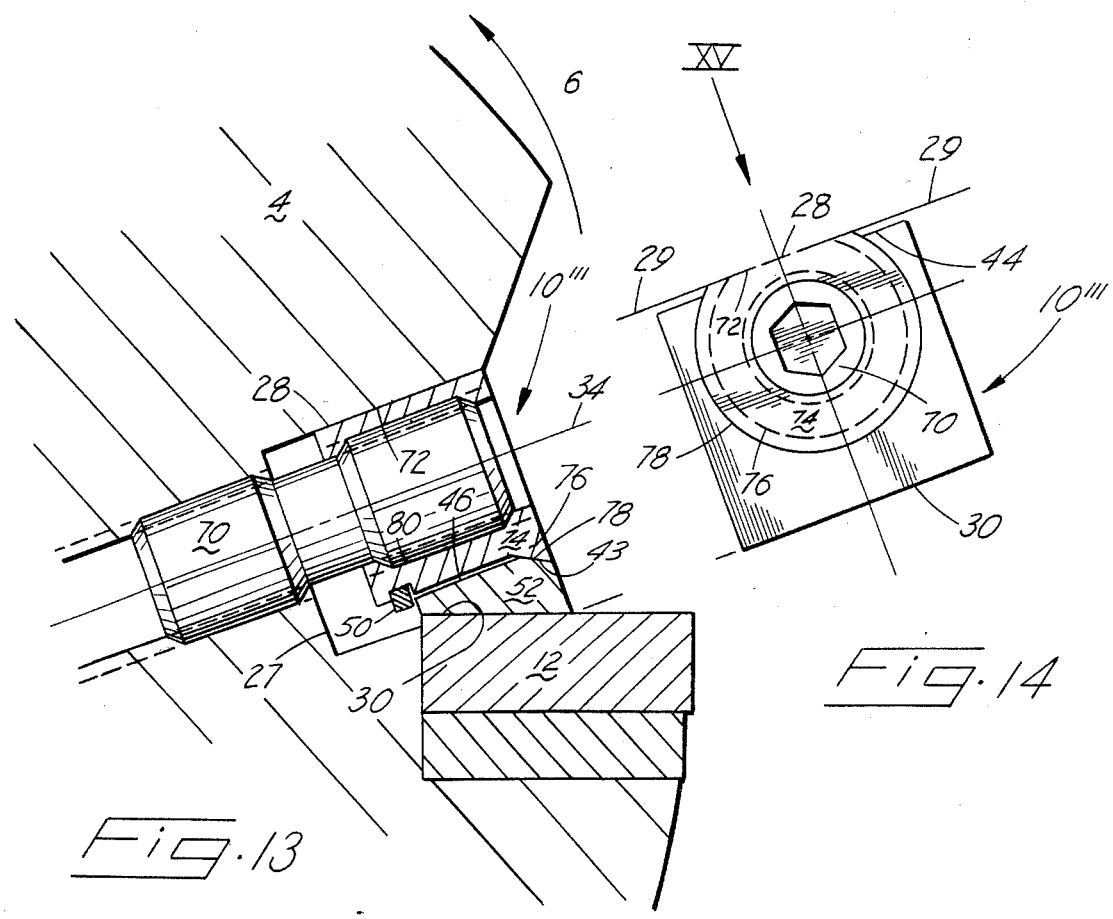
Fig. 13
Fig. 14
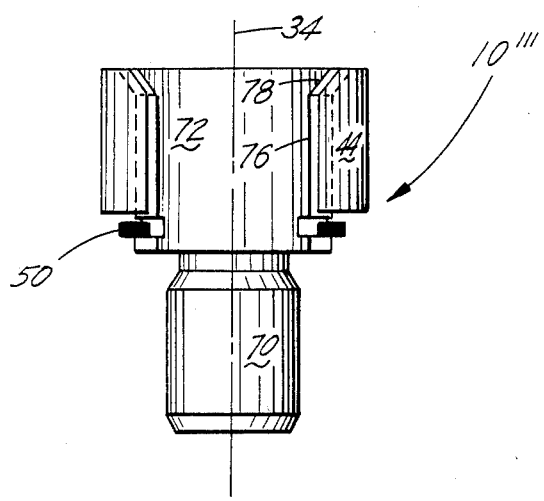
Fig. 15

MILLING CUTTER AND METHOD OF ASSEMBLING THEREFOR

RELATED APPLICATION

This application is a continuation-in-part of copending application Ser. No. 387,344, filed June 11, 1982 and now abandoned.

BACKGROUND OF THE INVENTION

This invention relates to the field of metal-cutting tools, and more specifically, to milling cutters.

In those types of milling cutters having indexable inserts, each insert is clamped into a pocket of the cutter body by a wedge clamp, several of which are well known in the prior art. Most of the inserts so used in milling cutters are made from cemented carbide material.

During the manufacture of the milling cutter, and more particularly, the machining of the insert pockets and clamp recesses as well as the clamp itself, various tolerances are created. The more surfaces that are machined, the more tolerances that are created. While some tolerances may cancel each other out, other tolerances may add together so as to result in a cumulative tolerance.

When the insert is placed in the insert pocket and the wedge applied, this cumulative tolerance may prevent the wedge face from making planar contact with the insert. Instead, the wedge may meet the insert along a line, or perhaps even at a point. With cemented carbide inserts, this nonplanar contact is not a problem since cemented carbides have a certain amount of toughness which allows them to withstand nonplanar contact.

On the other hand, if ceramic inserts are used, as is often the case today, a serious problem is encountered. Ceramic inserts are extremely brittle. If there is nonplanar contact between the wedge face and the insert, as is possible with conventional clamping means, the insert may crack.

It would, of course, be desirable to be able to clamp a ceramic insert without causing it to crack.

It is thus an object of this invention to have a means of clamping a ceramic insert without causing it to crack.

It is another object to have a clamp in which there is always planar contact between a surface of the clamp and the insert.

It is a further object to have a clamp that is simple to use and manufacture as well as economical to buy.

It is a still further object of this invention carbide inserts as well as ceramic inserts. to have a clamp that is usable with cemented

BRIEF SUMMARY OF THE INVENTION

According to the present invention, there is a milling cutter comprising a cutter body rotatable about its central axis, a peripheral wall on the cutter body and insert pockets and clamp recesses located in the peripheral wall. The insert pockets have locating surfaces for positioning an insert when placed in the pocket. There is also clamp means for releasably clamping an insert when the insert is placed and positioned in the pocket. The clamp means freely assumes an orientation identical to that of the insert so that planar contact is made with the insert.

The clamp means has a first planar surface for abutting engagement with an insert and a movement means for advancing and retracting the first planar surface from abutting engagement with the insert. The first planar surface has a preselected limited pivotal movement in all directions about the axis of the movement means when in an unclamped position.

The clamp recess has a clamp contact surface and the movement means has a bearing surface located about its axis. The bearing surface and the first planar surface cooperate through a wedging action transmitting surface so that as the bearing surface abuts the clamp contact surface the first planar surface pivots to conform to the surface orientation of the insert. Preferably, the bearing surface is convex.

The clamp means further comprises a second planar surface opposite the first planar surface. The first and second planar surfaces are rigidly associated with each other and are also associated with a C-shaped perforation within which the bearing surface is rotataby movable. The perforation communicates with the second planar surface. The bearing surface has a portion protruding beyond the perforation and beyond the second planar surface. The bearing surface portion abuts the clamp contact surface when in a clamped position.

More preferably, the clamp means further comprises a retaining ring on the movement means so that the movement means is captively held in the perforation.

The milling cutter further comprises a shim located rearward in the rotational sense of the insert and is interposed between the insert and the insert pocket. Preferably, the insert is a hard wear resistant ceramic material.

In another preferred embodiment, the bearing surface is planar and the retaining ring is perpendicular to the bearing surface so that the bearing surface is captively held by the perforation.

According to the invention, disclosed is a clamp means for clamping an insert to a cutter body. The clamp means comprises a wedge and a movement means cooperating with the wedge. The wedge has a top and bottom joined together on one side by a first planar surface. The first planar surface has a preselected limited pivotal movement in all directions about the axis of the movement means.

Preferably, the movement means has a bearing surface located about its axis. In one preferred embodiment, the bearing surface is convex. Preferably, also, the wedge has a second planar surface joining the top and bottom on the opposite side from the first planar surface. The wedge also has a C-shaped perforation between the top and bottom surface and communicating with the second planar surface. The bearing surface is rotatably movable within the perforation and beyond the second planar surface.

More preferably, the wedge perforation has a lip where the perforation intersects the bottom and the movement means has a retaining ring. The movement means is captively held in the perforation by the retaining ring interacting with the lip.

According to the present invention, disclosed is a method of assembling a milling cutter of the type having inserts, insert pockets, clamp recesses and locating surfaces for positioning the inserts. The method comprises placing an insert into an insert pocket and accurately positioning the insert with respect to a locating surface and then placing a wedge having a first planar surface, cooperating movement means and a bearing surface into the clamp recess so that the first planar surface rests against the insert. The method further comprises advancing the movement means so that the first planar surface rests against the insert and then advancing the movement means so that the first planar surface pivots and freely assumes an orientation identical to that of the insert so that planar contact is made with the insert. A further step is tightening the movement means so that the bearing surface moves into abutting engagement with a clamp contact surface in the clamp recess. The final step of the method comprises repeating each step a number of times corresponding to the number of insert pockets.

BRIEF DESCRIPTION OF THE DRAWINGS

The exact nature of the present invention will become more clearly apparent upon reference to the following detailed specification taken in connection with the accompanying drawings in which:

FIG. 3 is a plan view of the cutter body with associated hardware removed.

FIG. 4 is a side view of the cutter body of FIG. 3.

FIG. 5 is a sectional view of the milling cutter according to the invention along the line V—V of FIG. 2.

FIG. 6 is an end view of the clamp means of FIG. 5.

FIG. 7 is a sectional view showing planar contact between an insert and a clamping surface.

FIG. 8 is a sectional view showing nonplanar contact between an insert and a clamping surface.

FIG. 9 is a sectional view similar to FIG. 5 showing another embodiment of the clamp means.

FIG. 10 is an end view of the clamp means of FIG. 9.

FIG. 11 is a sectional view similar to FIG. 5 but showing a further embodiment of the clamp means.

FIG. 12 is an end view of the clamp means of FIG. 11.

FIG. 13 is a sectional view similar to FIG. 5 but showing a still further embodiment of the clamp means.

FIG. 14 is an end view of the clamp means of FIG. 13.

FIG. 15 is a view of FIG. 14 in the direction of arrow XV.

DETAILED DESCRIPTION OF THE INVENTION

Figure 1:
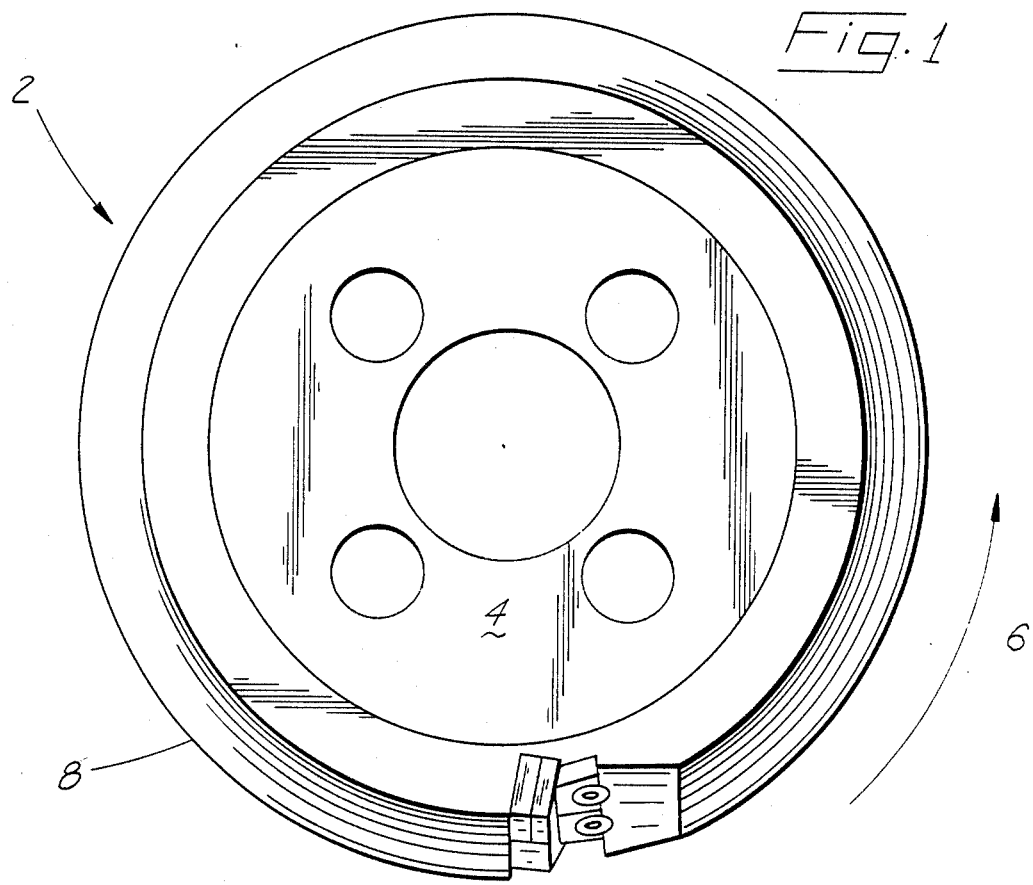
FIG. 1 is a plan view of the milling cutter according to the invention.
Figure 2:
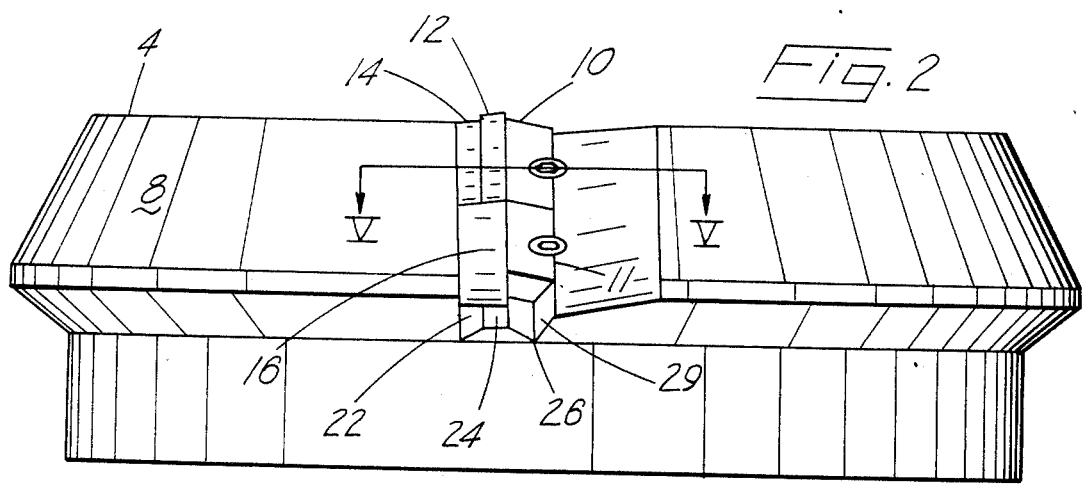
FIG. 2 is a side view of the milling cutter of FIG. 1.

Referring to the drawings somewhat more in detail, FIGS. 1 and 2 show the assembled milling cutter 2. There is a cutter body 4 having a direction of rotation 6, a peripheral wall 8, clamp means 10 and insert 12.

FIGS. 3 and 4 show the cutter body by itself without the associated hardware. Shown is a chip gash portion 18, an insert pocket 19 and clamp recess 26.

As can be seen in FIGS. 1 through 4, there is only one station shown. A station comprises a cutter body along with its associated hardware, such as clamp means and inserts. While only one station is shown, it is understood that a milling cutter typically comprises several such stations.

Referring now to FIGS. 1 through 4 together, disclosed according to the invention is a milling cutter. The milling cutter 2 comprises a cutter body 4, rotatable in the direction of rotation 6 about its central axis. There is a peripheral wall 8 on the cutter body 4 and insert pockets 19 and clamp recesses 26 located in the peripheral wall 8. The insert pockets have locating surfaces 24 for positioning an insert 12 when placed in the pocket 19. There is clamp means 10 for releasably clamping an insert 12 when the insert is placed and positioned in the pocket 19. The clamp means 10 freely assumes an orientation identical to that of the insert so tht planar contact is made with the insert.

Referring now to FIGS. 5 and 6, the clamp means 10 has a first planar surface 30 for abutting engagement with an insert 12. There is a movement means 32 for advancing and retracting the first planar surface 30 from abutting engagement with the insert. The first planar surface 30 has a preselected limited pivotal movement in all directions about the axis 34 of the movement means when in an unclamped position.

The advantages of this invention can best be seen by referring to FIGS. 7 and 8. FIG. 7 shows the first planar surface meeting the insert according to this invention. It is obvious that the first planar surface and the insert are making complete planar contact. FIG. 8 shows contact that is achieved according to the prior art. In the prior art clamping means, there would possibly be line or point contact, as shown, for example, at 40. Such line or point contact would be disastrous to ceramic inserts as it would likely cause the insert to crack.

Cemented carbide inserts can survive the nonplanar contact due to their greater toughness; however, the nonplanar contact may cause the insert to tilt slightly within its pocket, which can have an adverse effect on insert life. It is apparent, then, that applicants' invention could be advantageously applied to cemented carbide inserts as well as ceramic inserts.

Referring back to FIGS. 5 and 6, the clamp recess 26 has a clamp contact surface 28 and the movement means 32 has a bearing surface 42 located about its axis 34. The bearing surface 42 and the first planar surface 30 cooperate through wedging action transmitting surface 43 so that as the bearing surface abuts the clamp contact surface 28, the first planar surface 30 pivots to conform to the surface orientation of the insert 12.

The clamp means further comprises a second planar surface 44 opposite the first planar surface. The first and second planar surfaces are rigidly associated with each other and are also associated with a C-shaped perforation 46 within which the bearing surface 42 is rotatably movable. The perforation communicates with the second planar surface 44. The bearing surface has a portion 48 protruding beyond the perforation and beyond the second planar surface. The bearing surface portion 48 abuts the clamp contact surface 28 when in a clamped position.

In a preferred embodiment, the bearing surface is convex.

In order to achieve the objects of the invention, it is necessary to avoid all contact between the second planar surface 44 and both the clamp contact surface 28 and the top wall 29 of the clamp recess.

Preferably, the clamp means further comprises a retaining ring 50 on movement means 32 so that the movement means is captively held in the perforation 46. The movement means is typically threaded 25 into the back wall 27 of the clamp recess.

The milling cutter further comprises a shim 14 located rearwardly, in the rotational sense, of the insert 12 and is interposed between the insert and the insert pocket 19.

The insert pocket may also have shim locating position 22 and bottom wall 20. As can be seen in FIGS. 1 and 2, the milling cutter may also have a nest 16 and a second clamp means 11. The second clamp means is used solely for clamping the nest.

Preferably, the insert 12 is a hard wear resistant ceramic material. However, other inserts are contemplated within the scope of the invention. Such other inserts may be cemented carbide inserts as are well known in the art.

Referring back to FIGS. 5 and 6, according to the invention, there is clamp means 10 for clamping insert 12 to a cutter body 4. The clamp means comprises a wedge 52 and a movement means 32 cooperating with the wedge. The wedge has a top 54 and a bottom 56 joined together on one side by a first planar surface 30. The first planar surface has a preselected limited pivotal movement in all directions about the axis 34 of the movement means.

The movement means has a bearing surface 42 located about its axis 34. The wedge 52 has a second planar surface 44 joining the top 54 and the bottom 56 on the opposite side from the first planar surface. The wedge also has a C-shaped perforation 46 between the top 54 and bottom 56 and communicating with the second planar surface 44. The bearing surface 42 is rotatably movable within the perforation and has a portion 48 protruding beyond the perforation and beyond the second planar surface.

In a preferred embodiment, the bearing surface is convex.

Preferably, the wedge perforation 46 has a lip 58 where the perforation 46 intersects the bottom 56 and the movement means has a retaining ring 50. The movement means is captively held in the perforation by the retaining ring interacting with the lip.

Referring now to FIGS. 9 and 10, shown is a modified clamp means 10'. The modification principally lies in the head 60 of the movement means wherein the head is slightly recessed. Notwithstanding this modification, the bearing surface 42 and the first planar surface 30 cooperate through wedging action transmitting surface 43, as before, so that as the bearing surface abuts the clamp contact surface 28, the first planar surface 30 pivots to conform to the surface orientation of the insert 12.

While it is preferred to have the clamp means forward, in the rotational sense of the insert, it is also contemplated within the scope of the invention to have the clamp means rearward of the insert, as is shown in FIGS. 11 and 12. Bearing surface 42 of modified clamp means 10" has a portion which abuts clamp contact surface 28 when in a clamped position. Wedging action transmitting surface 43 is located slightly differently but, nevertheless, cooperates in a similar manner with first planar surface 30 and bearing surface 42.

A further modification of the milling cutter and clamping means is illustrated in FIGS. 13, 14 and 15. The milling cutter body 4 has clamp means 10'''. The clamp means 10''' has a first planar surface 30 for abutting engagement with an insert 12. There is a movement means 70 for advancing and retracting the first planar surface 30 from abutting engagement with the insert. The first planar surface 30 has a preselected limited pivotal movement in all directions about the axis 34 of the movement means when in an unclamped position.

The clamp recess 26 has a clamp contact surface 28 and the movement means 70 has a bearing surface 72 located about its axis 34.

In the other embodiments of this invention, the movement means and the bearing surface would normally be located on the same member. In contrast to these embodiments, the movement means 70 and the bearing surface 72 in the FIG. 13, 14 and 15 embodiment are now on separate members.

Preferably, the movement means 70 is now a double-ended oppositely threaded fastener.

The bearing surface 72 is now located on bushing 74. The bushing 74 has a diametrical portion 76 and a conical portion 78. Extending longitudinally of the bushing and on its periphery is a planar portion, the bearing surface 72. The bushing also has a perforation 80 for threadedly engaging the movement means 70.

The bushing is rotatably mounted in the C-shaped perforation 46 of the wedge 52. Preferably, there is a retaining ring 50 perpendicular to the bearing surface 72 so that the bearing surface is captively held by the perforation.

In the assembly of the clamp means in the clamp recess, the movement means is threadedly engaged with the bushing. The bushing is then rotatably mounted in the C-shaped perforation of the wedge and is captively held there by the retaining ring 50. When threadedly engaging the movement means with the back wall 27 of the clamp recess, it is necessary to insure that the bearing surface 72 faces the clamp contact surface 28. As the bearing surface 72 is rotatable within perforation 46 as well as around axis 34, it is possible that bearing surface 72 will not face clamp contact surface 28. If the bearing surface does not face the clamp contact surface, improper clamping will result; hence, the necessity for properly situating the bearing surface.

The bearing surface 72 and the first planar surface 30 cooperate through wedging action transmitting surface 43 and conical portion 78 so that as the bearing surface abuts the clamp contact surface 28, the first planar surface 30 pivots to conform to the surface orientation of the insert 12. Since the bearing surface is planar in this embodiment, the clamp contact surface should be planar as well.

In order to achieve the objects of the invention, it is necessary to avoid all contact between the second planar surface 44 and both the clamp contact surface 28 and the top wall 29 of the clamp recess. This contact is avoided by having the bearing surface 72 protrude beyond the perforation and beyond the second planar surface.

According to the invention, there is a method of assembling a milling cutter of the type having inserts, insert pockets, clamp recesses and locating surfaces for positioning the inserts.

The method comprises placing an insert 12 into an insert pocket 19 and accurately positioning the insert with respect to a locating surface 24. The next step is placing a wedge 52 having a first planar surface 30, cooperating movement means 32 and a bearing surface (42 or 72) into the clamp recess so that the first planar surface rests against the insert. A further step is advancing the movement means so that the first planar surface pivots and freely assumes an orientation identical to that of the insert so that planar contact is made with the insert. The method further comprises tightening the movement means so that the bearing surface (42 or 72) moves into abutting engagement with a clamp contact surface 28 in the clamp recess 26. The final step of the process comprises repeating each step a number of times corresponding to the number of insert pockets.

A milling cutter station typically comprises a cutter body and associated hardware such as inserts, clamps, shims and the like. As shown in the figures, there is only one station. However, it is understood that in the milling cutters with which this invention is most concerned, there will be several such stations.

Modifications may be made within the scope of the appended claims.

What is claimed is:

1. A milling cutter comprising: a cutter body rotatable about its central axis; a peripheral wall on said cutter body; insert pockets and clamp recesses located in said peripheral wall, said insert pockets having locating surfaces for positioning an insert when placed in said pocket; and clamp means for releasably clamping an insert when the insert is placed and positioned in said pocket, said recesses each having a clamp contact surface and said clamp means comprising movement means; a bushing pivotally mounted around said movement means with a bearing surface and wedge means having a planar surface, means pivotally mounting said wedge means around said bushing so that said bearing surface contacts said clamp contact surface when said planar surface contacts an insert in said pocket.

* * * * *